United States Patent
Bar-Haim et al.

(10) Patent No.: US 10,416,585 B2
(45) Date of Patent: *Sep. 17, 2019

(54) ELECTROSTATIC INK COMPOSITIONS

(71) Applicant: HP Indigo B.V., Amstelveen (NL)

(72) Inventors: Gil Bar-Haim, Nes Ziona (IL); Alina Grishman, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,211

(22) Filed: Dec. 6, 2017

(65) Prior Publication Data

US 2018/0120718 A1 May 3, 2018

Related U.S. Application Data

(63) Continuation of application No. 15/109,777, filed as application No. PCT/EP2014/051829 on Jan. 30, 2014, now Pat. No. 9,921,512.

(51) Int. Cl.
| | | |
|---|---|---|
| *G03G 9/135* | (2006.01) | |
| *G03G 9/08* | (2006.01) | |
| *G03G 13/10* | (2006.01) | |
| *G03G 9/097* | (2006.01) | |
| *C09D 11/03* | (2014.01) | |

(Continued)

(52) U.S. Cl.
CPC ............ *G03G 9/135* (2013.01); *C09D 11/03* (2013.01); *C09D 11/106* (2013.01); *G03G 9/08* (2013.01); *G03G 9/0804* (2013.01); *G03G 9/0808* (2013.01); *G03G 9/09733* (2013.01); *G03G 9/12* (2013.01); *G03G 9/132* (2013.01); *G03G 13/10* (2013.01)

(58) Field of Classification Search
CPC .. G03G 9/135; G03G 9/09733; G03G 9/1355; G03G 9/131; G03G 9/08728; G03G 9/0804; G03G 9/0808; G03G 9/09758; G03G 13/10
See application file for complete search history.

(56) References Cited

U.S. PATENT DOCUMENTS 4,797,341 A * 1/1989 Tsubuko ............... G03G 9/12
                                                        430/114
4,891,286 A   1/1990 Gibson
(Continued)

FOREIGN PATENT DOCUMENTS

CN       1155685      7/1997
CN       1555511      12/2004
(Continued)

OTHER PUBLICATIONS

International Search Report dated Jun. 23, 2014 for PCT/EP2014/051829, Applicant Hewlett-Packard Indigo B.V.
(Continued)

*Primary Examiner* — Christopher D Rodee
(74) *Attorney, Agent, or Firm* — Thorpe North & Western LLP

(57) ABSTRACT

Herein is disclosed an electrostatic ink composition, wherein the composition is formable by combining: chargeable particles comprising a resin comprising a polymer having acidic side groups, and a cyclic anhydride. Also disclosed herein is a method of forming an electrostatic ink composition, and a method of electrostatic printing.

22 Claims, 6 Drawing Sheets

(51) Int. Cl.
*C09D 11/106* (2014.01)
*G03G 9/12* (2006.01)
*G03G 9/13* (2006.01)

(56) References Cited

U.S. PATENT DOCUMENTS

| | | | |
|---|---|---|---|
| 5,244,766 A * | 9/1993 | Houle | G03G 9/12 |
| | | | 430/114 |
| 5,330,872 A | 7/1994 | Materazzi et al. | |
| 6,633,735 B2 | 10/2003 | Kellie et al. | |
| 6,806,013 B2 | 10/2004 | Morrison et al. | |
| 8,101,329 B2 * | 1/2012 | Fukushima | G03G 9/0872 |
| | | | 430/108.11 |
| 8,299,140 B2 | 10/2012 | Nair | |
| 9,921,512 B2 * | 3/2018 | Bar-Haim | C09D 11/03 |
| 2002/0064397 A1 | 5/2002 | Kellie et al. | |
| 2003/0032700 A1 | 2/2003 | Morrison et al. | |
| 2004/0265756 A1 | 12/2004 | Horie | |
| 2009/0104556 A1 | 4/2009 | Grierson et al. | |
| 2009/0162775 A1 | 6/2009 | Nair | |
| 2011/0189606 A1 * | 8/2011 | Silcoff | G03G 9/125 |
| | | | 430/115 |
| 2011/0217650 A1 | 9/2011 | Mor et al. | |
| 2013/0224649 A1 | 8/2013 | Bar-Haim et al. | |

FOREIGN PATENT DOCUMENTS

| | | | |
|---|---|---|---|
| EP | 0772093 | 5/1997 | |
| JP | S6218570 | 1/1987 | |
| JP | S6411266 | 1/1989 | |
| JP | 2006016473 | 1/2006 | |
| JP | 4625275 | 2/2011 | |
| WO | 03009064 | 1/2003 | |
| WO | 2007130069 | 11/2007 | |
| WO | 2012130303 | 10/2012 | |
| WO | WO-2013044991 A1 * | 4/2013 | G03G 9/13 |
| WO | 2013107498 | 7/2013 | |

OTHER PUBLICATIONS

Baker Hughes, Ceramer Polymers, Specialty polymers and waxes to meet your needs, www.bakerhughes.com/polymers, 2011.
English language machine translation of JP2006016473 (Jan. 2006).
English language machine translation of JPS6411266 (Jan. 1989).
English language machine translation of JPS6218570 (Jan. 1987).

* cited by examiner

ELECTROSTATIC INK COMPOSITIONS

The present application is a continuation of U.S. patent application Ser. No. 15/109,777, filed on Jul. 15, 2016, which is a national stage application of PCT/EP2014/051829, filed on Jan. 30, 2014, and which has issued as U.S. Pat. No. 9,921,512, each of which is incorporated herein by reference in its entirety.

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition including charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, which is often heated to fuse the solid image and evaporate the liquid carrier, and then to the print substrate.

DETAILED DESCRIPTION

Figure 1:
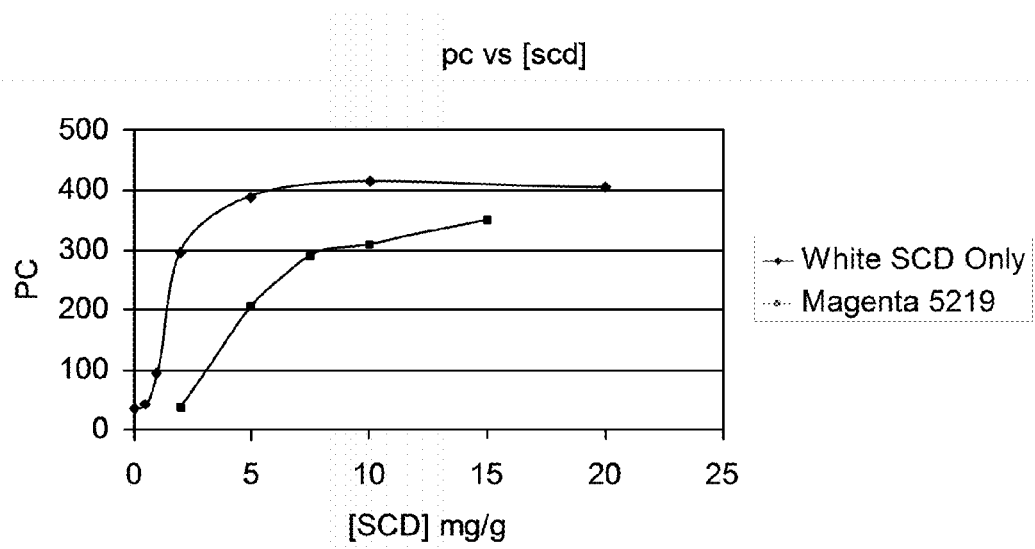
FIG. 1 shows the particle charge (PC) of a commercially available HP White SCD Electroink™ plotted against the concentration of Synthetic Charge Director (SCD) (given in mg of charge director per g of solids), as discussed in Comparative Example 1 herein.

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymer resin, colorant, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form that is typically suitable for use in an electrostatic printing process, sometimes termed an electrophotographic printing process. The electrostatic ink composition may include chargeable particles of the resin and the colorant dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition, wherein the composition is formable by combining:
chargeable particles comprising a resin comprising a polymer having acidic side groups, and
a cyclic anhydride.

In a further aspect, there is provided a method of forming an electrostatic ink composition, the method including combining:
chargeable particles comprising a resin comprising a polymer having acidic side groups, and
a cyclic anhydride.

In a further aspect, there is provided a method of electrostatic printing, the method including:
providing an electrostatic ink composition as described herein,
contacting the electrostatic ink composition with a latent electrostatic image on a surface to create a developed image,
transferring the developed image to a print substrate.

It has been found that some electrostatic inks are highly sensitive to charge director concentrations within a desired working window of particle conductivity. This can be undesirable, since keeping the ink within the target charging window requires a high degree of control of the concentration of the charge director or the resulting charging level of the electrostatic ink composition. The sensitivity of the inks to the level of charge director can be due to a number of factors, including new fillers, new resins, or certain types of charge directors. There was a desire to reduce the sensitivity of the particle conductivity to the concentration of charge director. It was found that the addition of cyclic anhydrides has the effect of reducing the particle charge. By virtue of the relationship of the particle charge with concentration of the charge director (the gradient decreasing with the concentration of charge director), this has the effect of reducing the sensitivity of the particle conductivity within a desired working window of charging ability.

Cyclic Anhydride

The cyclic anhydride may be defined as a molecule having an anhydride group (—(C=O)—O—(C=O)—) that forms part of a ring of covalently bonded atoms. The cyclic anhydride may be selected from a five- or six-membered cyclic anhydride. A five-membered cyclic anhydride is a molecule having an anhydride group that forms part of a five-membered ring. A six-membered cyclic anhydride is a molecule having an anhydride group that forms part of a six-membered ring.

In some examples, the cyclic anhydride includes a first ring, of which an anhydride group form part, and at least one further ring, which is an optionally substituted aryl group which is fused to the first ring on at least one side thereof. In some examples, the cyclic anhydride includes a first, five-membered ring, of which an anhydride group form part, and at least one further ring, which is an optionally substituted phenyl group which is fused to the first ring on at least one side thereof. In some examples, the cyclic anhydride includes a first, six-membered ring, of which an anhydride group form part, and at least one further ring, which is an optionally substituted naphthalene group which is fused to the first ring on at least one side thereof, in some example two sides thereof. In some examples, the cyclic anhydride includes a molecule including two cyclic anhydride groups.

In some examples, the cyclic anhydride includes a molecule of formula (I)

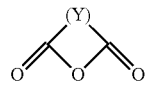

formula (I)

wherein —(Y)— is a group selected from

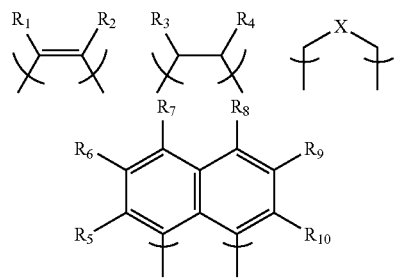

wherein $R_1$ and $R_2$ either together form an optionally substituted ring or are each independently selected from a group selected from hydrogen, halogen, optionally substituted alkyl, nitro, cyano, hydroxy, optionally substituted alkoxy, optionally substituted amino, carboxy, alkoxycarbonyl, optionally substituted alkylcarbonyloxy, optionally substituted arylalkoxy, optionally substituted acyl, and optionally substituted aminocarbonyl;

$R_3$ and $R_4$ either together form an optionally substituted ring or are each independently selected from a group selected from hydrogen, halogen, optionally substituted alkyl, nitro, cyano, hydroxy, optionally substituted alkoxy, optionally substituted amino, carboxy, alkoxycarbonyl, optionally substituted alkylcarbonyloxy, optionally substituted arylalkoxy, optionally substituted acyl, and optionally substituted aminocarbony;

—X— is selected from —O— and —$CR_{11}R_{12}$—, wherein $R_{11}$ and $R_{12}$ are each independently selected from a group selected from hydrogen, halogen, optionally substituted alkyl, nitro, cyano, hydroxy, optionally substituted alkoxy, optionally substituted amino, carboxy, alkoxycarbonyl, optionally substituted alkylcarbonyloxy, optionally substituted arylalkoxy, optionally substituted acyl, and optionally substituted aminocarbony;

$R_5$, $R_6$, $R_7$, $R_8$, $R_9$, $R_{10}$ are each independently selected from a group selected from hydrogen, halogen, optionally substituted alkyl, nitro, cyano, hydroxy, optionally substituted alkoxy, optionally substituted amino, carboxy, alkoxycarbonyl, optionally substituted alkylcarbonyloxy, optionally substituted arylalkoxy, optionally substituted acyl, and optionally substituted aminocarbony. In some examples at least two of $R_5$, $R_6$, $R_7$, $R_8$, $R_9$, $R_{10}$ together form a ring (e.g. in some examples, $R_7$ and $R_8$ together form a ring) and the ring may be selected from an anhydride-containing ring, an optionally substituted alkyl ring, an optionally substituted aryl ring, and an optionally substituted heteroaryl ring.

As mentioned, $R_1$ and $R_2$ may together form an optionally substituted ring, and the ring may be an alkyl, aryl or heteroaryl ring; and in some examples, the aryl ring is an optionally substituted phenyl or optionally substituted naphthyl ring. In some examples, $R_1$ is a halogen, which may be selected from fluorine, chlorine, bromine and iodine and $R_2$ is hydrogen. In some examples, $R_1$ and $R_2$ are each a halogen, and in some example, each of which may be independently selected from fluorine, chlorine, bromine and iodine.

In some examples, $R_{11}$ and $R_{12}$ are each independent selected from a group selected from hydrogen and optionally substituted alkyl, and the alkyl is selected from C1 to C10 alkyl, in some examples C1 to C5 alkyl, in some examples methyl, ethyl, propyl, butyl and pentyl. In some examples, $R_{11}$ and $R_{12}$ are each optionally substituted alkyl, and the alkyl is selected from C1 to C10 alkyl, in some examples C1 to C5 alkyl, in some examples methyl, ethyl, propyl, butyl and pentyl.

In formula (I) above, if it contains an alkyl, each alkyl may independently be a branched or straight chain alkyl, optionally a branched or straight chain $C_1$ to $C_{10}$ alkyl, optionally a branched or straight chain $C_1$ to $C_6$ alkyl, optionally a branched or straight chain $C_1$ to $C_4$ alkyl, optionally selected from methyl, ethyl, n-propyl, i-propyl, n-butyl, i-butyl and t-butyl. Each alkyl may be optionally substituted unless otherwise stated. A substituted alkyl is an alkyl that has one or more substituents. The substituents may be selected from halogen, nitro, cyano, hydroxy, optionally substituted alkoxy, optionally substituted amino, carboxy, alkoxycarbonyl, methylenedioxy, ethylenedioxy, optionally substituted alkylcarbonyloxy and optionally substituted arylalkoxy.

In the formula (I) above, if it contains an aryl, each aryl may independently be selected from phenyl, naphthyl, dihydronaphthyl, tetrahydronaphthyl, indenyl and indanyl.

In the formula (I) above, if it contains a heteroaryl, each heteroaryl may independently be a mono- or bi-cyclic aromatic group having from 5 to 12 members and containing at least one hetero atom, optionally one, two or three heteroatoms, which, if more than one heteroatom is present, may be the same or different. The at least one heteroatom may be selected from oxygen, nitrogen and sulphur. Each heteroaryl may independently be selected from thienyl, furyl, pyrrolyl, pyridyl and indolyl. Each aryl or heteroaryl may be substituted unless otherwise stated. A substituted aryl or heteroaryl is an aryl ring or heteroaryl ring having one or more substituents; optionally the substituents are selected from halogen, optionally substituted alkyl, nitro, cyano, hydroxy, optionally substituted alkoxy, optionally substituted amino, carboxy, alkoxycarbonyl, methylenedioxy, ethylenedioxy, optionally substituted alkylcarbonyloxy, optionally substituted arylalkoxy, optionally substituted acyl, optionally substituted aminocarbonyl and carboxy.

In formula (I) above, if it contains a halogen, each halogen may be selected from fluorine, chlorine, bromine and iodine.

In formula (I) above, if it contains an optionally substituted amino, each optionally substituted amino may be selected from an unsubstituted amino group (—NH2), an amino group substituted with one alkyl group and an amino group substituted with two alkyl groups.

In some examples, the cyclic anhydride is selected from any of the following compounds

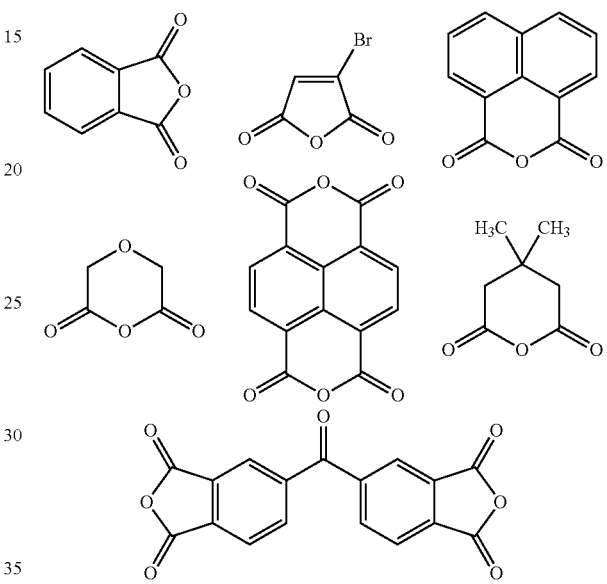

In some examples, the cyclic anhydride is selected from phthalic anhydride, benzophenone tetracarboxylic dianhydride, 3,3-dimethylglutaric anhydride, diglycolic anhydride, bromomaleic anhydride, 1,4,5,8-naphthalenetetracarboxylic dianhydride, 1,8-naphthalic anhydride, and derivatives, e.g. optionally substituted derivatives, thereof.

In some examples, the cyclic anhydride constitutes from 0.1 wt % to 10 wt % of the solids of the electrostatic ink composition, in some examples from 0.3 wt % to 5 wt % of the solids of the electrostatic ink composition, in some examples from 0.5 wt % to 3 wt % of the solids of the electrostatic ink composition.

Without being bound by theory, it is considered that the cyclic anhydride, on addition to the electrostatic ink composition (or components thereof), may react with a component of the electrostatic ink composition, for example acid groups on the resin and/or a charge adjuvant such as aluminium stearate, if present, to form a ring-opened reaction product (i.e. an acid) from the cyclic anhydride. In some examples, the cyclic anhydride may react with and bind to the acid groups of the resin. In some examples, if a metal-containing charge adjuvant is present, such as an aluminium stearate, the cyclic anhydride may react with and bind to the metal, e.g. aluminium, of the charge adjuvant (e.g. aluminium stearate), and, in some examples, displace a stearate group on the aluminium. It is believed that some of the relevant moieties within the ink that would be involved in the charging of the resin particles are blocked, and are prevented from participating in the charging process. Accordingly, the electrostatic ink composition may comprise a reaction product of the cyclic anhydride and the resin and/or, if a charge adjuvant is present, a reaction product of the cyclic anhydride and the charge adjuvant.

Liquid Carrier

The electrostatic ink composition may further include a liquid carrier. In some examples, the chargeable particles including the resin may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for toner particles, i.e. the chargeable particles including the resin and, in some examples, a colorant. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, lsopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Colorant

The electrostatic ink composition, either before or after having been printed on the print substrate, may further include a colorant. The chargeable particles including the resin may further include the colorant. The colorant may be selected from a pigment, dye and a combination thereof. The colorant may be transparent, unicolor or composed of any combination of available colors. The colorant may be selected from a cyan colorant, a yellow colorant, a magenta colorant and a black colorant. The electrostatic ink composition and/or ink printed on the print substrate may include a plurality of colorants. The electrostatic ink composition and/or ink printed on the plastic substrate may include a first colorant and second colorant, which are different from one another. Further colorants may also be present with the first and second colorants. The electrostatic ink composition and/or ink printed on the plastic substrate may include first and second colorants where each is independently selected from a cyan colorant, a yellow colorant, a magenta colorant and a black colorant. In some examples, the first colorant includes a black colorant, and the second colorant includes a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

In some examples, the electrostatic ink composition includes a white colorant.

In some examples, the white colorant is selected from $TiO_2$, calcium carbonate, zinc oxide, and mixtures thereof. In some examples, the electrostatic ink composition includes a white colorant selected from rutile, anatase, and brookite, and mixtures thereof. In some examples, the electrostatic ink composition includes a white colorant in the form of rutile. The rutile form of $TiO_2$ exhibits the highest refractive index among the other forms of $TiO_2$ and the other listed pigments. All other parameters of inks being the same, the highest refractive index yields the highest opacity.

In some examples, the electrostatic ink composition or the electrostatic ink lacks a colorant. In some examples, the electrostatic ink composition or the electrostatic ink lacks inorganic particulate material. In some examples, the electrostatic ink composition or the electrostatic ink is substantially transparent when printed.

The colorant may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.5 wt % of the solids of the electrostatic ink composition, in some examples at least 1 wt % of the solids of the electrostatic ink composition. In some examples the colorant may constitute from 1 wt % to 50 wt % of the solids of the electrostatic ink composition, in some example from 5 wt % to 40 wt % of the solids of the electrostatic ink composition, in some examples from 20 wt % to 40 wt % of the solids of the electrostatic ink composition, in some examples 25 wt % to 35 wt % of the solids of the electrostatic ink composition in some examples 5 wt % to 20 wt % of the solids of the electrostatic ink composition.

The colorant may include a pigment. The pigments can be any pigment compatible with the liquid carrier and useful for electrostatic printing. For example, the pigment may be present as pigment particles, or may include a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

Resin

The electrostatic ink composition includes a resin, which may be a thermoplastic resin. A thermoplastic polymer is sometimes referred to as a thermoplastic resin. The resin may coat a colorant, e.g. a pigment, such that the particles include a core of colorant, and have an outer layer of resin thereon. The outer layer of resin may coat the colorant partially or completely.

The resin includes a polymer. In some examples, the polymer of the resin may be selected from ethylene or propylene acrylic acid co-polymers; ethylene or propylene methacrylic acid co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylic acid ionomers and combinations thereof. The resin may further include other polymers, including, but not limited to, ethylene vinyl acetate co-polymers; co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethyl acrylate; polyesters; polyvinyl toluene; polyamides; styrene/butadiene co-polymers; epoxy resins; ethylene-acrylate terpolymers: ethylene-acrylic esters-maleic anhydride (MAH) or glycidyl methacrylate (GMA) terpolymers The resin may include a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may include a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN ionomers. The polymer including acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may include two different polymers having acidic side groups. The two polymers having acidic side groups may have different acidities, which may fall within the ranges mentioned above. The resin may include a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may include two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may include a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may include a first polymer having a melt viscosity of 15000 poise or more, in some examples 20000 poise or more, in some examples 50000 poise or more, in some examples 70000 poise or more; and in some examples, the resin may include a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may include a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition includes a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin includes a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may include two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN ionomers. The resin may include (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may include a polymer having acidic side groups, as described above (which may be free of ester side groups), and a polymer having ester side groups. The polymer having ester side groups may be a thermoplastic polymer. The polymer having ester side groups may further include acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403#, Nucrel 407™, Nucrel 609HS™, Nucrel 908HS™, Nucrel 1202HC™, Nucrel 30707™, Nucrel 1214™, Nucrel 903#, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

In some examples, the colorant constitutes a certain wt %, e.g. from 1 wt %, to 30 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a colorant and, in some examples, any other additives that may be present.

Charge Director and Charge Adjuvant

The electrostatic ink composition may include a charge director. The charge director may be added to an electrostatic ink composition in order to impart and/or maintain sufficient electrostatic charge on the ink particles. In some examples, the charge director may be selected from ionic compounds, such as metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the ink composition. In some examples, the charge director imparts a positive charge on the particles of the ink composition.

In some examples, the charge director includes a sulfosuccinate moiety of the general formula [$R_1$, —O—C(O)CH$_2$CH(SO$_3^-$)C(O)—O—$R_2$], where each of $R_1$' and $R_2$' is an alkyl group. In some examples, the charge director includes nanoparticles of a simple salt and a sulfosuccinate salt of the general formula MAn, wherein M is a metal, n is the valence of M, and A is an ion of the general formula [$R_1$'—O—C(O)CH$_2$CH(SO$_3^-$)C(O)—O—$R_2$'], where each of $R_1$', and $R_2$', is an alkyl group, or other charge directors as found in WO2007130069, which is incorporation herein by reference in its entirety. As described in WO2007130069, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of SO$_4^{2-}$, PO$^{3-}$, NO$^{3-}$, HPO$_4^{2-}$, CO$_3^{2-}$, acetate, trifluoroacetate (TFA), Cl$^-$, BF$_4$, F—, ClO$_4$—, and TiO$_3^{4-}$, or from any sub-group thereof. The simple salt may be selected from CaCO$_3$, Ba$_2$TiO$_3$, Al$_2$(SO$_4$) Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further include basic barium petronate (BBP).

In the formula [$R_1$O—C(O)CH$_2$CH(SO$_3^-$)C(O)—O—$R_2$'], in some examples each of $R_1$', and $R_2$', is an aliphatic alkyl group. In some examples, each of $R_1$', and $R_2$', independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$', and $R_2$', are the same. In some examples, at least one of $R_1$', and $R_2$', is C13H27. In some examples, M is Na, K, Cs, Ca, or Ba. The formula [$R_1$—O—C(O)CH$_2$CH(SO$_3^-$)C(O)—O—$R_2$'] and/or the formula MAn may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01% to 10% by weight, in some examples 0.01 to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001 to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

The electrostatic ink composition may include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition further includes a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the electrostatic ink composition further includes a salt of multivalent cation and a fatty acid anion and the composition further includes a charge director selected from metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols. In some examples, the electrostatic ink composition further includes a salt of multivalent cation and a fatty acid anion and the composition further includes a charge director selected from a sulfosuccinate moiety of the general formula [$R_1$—O—C(O)$CH_2$CH($SO_3^-$)C(O)—O—$R_2$], where each of $R_1$ and $R_2$ is an alkyl group, which may be as described above.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Method of Forming an Electrostatic Ink Composition

Also provided in an aspect is an electrostatic ink formable by the method described herein. Also provided herein is a method of forming an electrostatic ink composition, the method including combining:
    a resin including a polymer having acidic side groups, and
    a cyclic anhydride.

In an aspect, there is provided an electrostatic ink composition comprising chargeable particles comprising a resin, wherein the composition is formable a method involving combining:
    a resin comprising a polymer having acidic side groups, and
    a cyclic anhydride.

In some examples, there is provided a method of forming an electrostatic ink composition, the method including combining chargeable particles comprising a resin comprising a polymer having acidic side groups, and a cyclic anhydride.

In the method herein, the chargeable particles may be formed before, during or after contacting the resin comprising a polymer having acidic side groups and the cyclic anhydride.

In some examples, the method of forming an electrostatic ink composition includes:
    combining a carrier liquid, a resin including a polymer having acidic side groups, a pigment, a cyclic anhydride and, in some examples, a charge director, such that the electrostatic ink composition is formed, wherein the method involves grinding the carrier liquid, the resin including the polymer having acidic side groups and a pigment, to form chargeable particles including the resin including a polymer having acidic side groups and the pigment, and the cyclic anhydride is added to the composition before, during or after the grinding the carrier liquid, the resin and the pigment, and, if a charge director is added, the charge director is added after the grinding.

In some examples, the method of forming an electrostatic ink composition, includes:
    combining a carrier liquid, chargeable particles including a resin including a polymer having acidic side groups, a pigment, a cyclic anhydride and, in some examples, a charge director, such that the electrostatic ink composition is formed.

The method can include mixing the resin and the carrier liquid under appropriate conditions, in some examples in the presence of a cyclic anhydride and/or a pigment and/or a charge adjuvant, such as aluminum stearate, to form the particles including the resin, and, in some examples, the cyclic anhydride or reaction product thereof, and/or a pigment and/or a charge adjuvant, within the carrier liquid; and, in some examples, then mixing the charge director with the carrier liquid and, if a cyclic anhydride has not already been added, the cyclic anhydride. One or more further additives as described herein may be added at any time during the method. The steps described above are not intended to be bound by any particular order. For example, the mixing of the resin with the carrier liquid may be performed before, after, or concurrently with the step of combining the charge director and/or cyclic anhydride with the carrier liquid. Additionally, the steps may be combined or performed in a different order as is known in the art. Additionally, the steps may include other necessary processing steps as is known in the art.

Printing Process and Print Substrate

Also provided is a method of electrostatic printing, the method including:
    providing an electrostatic ink composition as described herein,
    contacting the electrostatic ink composition with a latent electrostatic image on a surface to create a developed image,
    transferring the developed image to a print substrate, in some examples via an intermediate transfer member.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

EXAMPLES

The following illustrates examples of the methods and other aspects described herein. Thus, these Examples should not be considered as limitations of the present disclosure, but are merely in place to teach how to make examples of the present disclosure.

'Resin 960' in the following examples is Nucrel 960 provided by Du Pont, a copolymer of ethylene and ethylene methacrylic acid, known by its trade name. 'Resin 925' in the following examples is Nucrel 925, available from DuPont, and is a copolymer of ethylene and ethylene meta acrylic acid. 'Resin 699' used in the following examples is Dupont Nucrel® 699, which is a co-polymer of ethylene and methacrylic acid. Resin 960 has a higher acid number than resin 699. Resin '5120' used in the following examples is Honeywell A-C® 5120, which is a co-polymer of ethylene and acrylic acid. Resins '925', '960', '699' and '5120', and similar resins, can be used in various combinations in the inks.

In the following examples, 'Isopar' is Isopar™ L Fluid, produced by ExxonMobil and having CAS Number 64742-48-9.

In the following examples, HP White Electroink™ for HP Indigo WS6000 series and 7000 series of digital press's is an electrostatic ink composition containing a white pigment as colorant, mixed resins '960', '699' and '5120' in the weight ratios of 50-80: 5-30:10-40, and a synthetic charge director (SCD), which is a barium bis sulfosuccinate salt, as described in WO2007130069, including a sulfosuccinate moiety of the general formula [$R_1$—O—C(O)$CH_2$CH($SO_3^-$)C(O)—O—$R_2$], wherein each of $R_1$ and $R_2$ independently is a $C_6$-25 alkyl, generally mainly C13 alkyl. When a weight of this SCD is referred to in the later Examples and the Figures, it refers to the weight of a barium bis sulfosuccinate salt per gram of solids in the ink composition.

In the following examples, HP Magenta SCD Electroink™ is an electrostatic ink composition containing a magenta pigment as colorant can be prepared based on the resins '960', '699' and '5120' (which will be termed a 'Coral' electrostatic ink composition herein) or based on a '4.0' resins set of 70-90% of resin "699" and 10-30% resin '5120' or '5.0' resins set of 70-95% resin '960' and 5-30% of resin '5120', and SCD (as above).

In the following examples, HP Black Electroink™ for HP Indigo WS6000 series and 7000 series of digital press's and is an electrostatic ink composition containing a black pigment as colorant, mixed resins '699' and '5120' in ratio 50-95 and 5-40 respectively, and SCD (as above).

In the following examples, 'Coral' Electroink™ is an electrostatic ink composition containing a pigment as colorant, mixed resins of Nucrel 925, Nucrel 2806 and Bynel 2022, generally in the weight ratios of 50-85:10-30:5-20, all of which are available from DuPont and SCD (as above).

In the following examples, Particle Conductivity (PC) is derived from measurements for the high field and low field conductivities of the ink composition, as explained below. High field conductivity (HFC) is measured in pmho/cm. This term defines the current collected under the application of a high electric field where charged/ionized electrostatic ink particles and charged/ionized. High field conductivity was measured at 1500 V/mm using a DC current at 23° C.

Low field conductivity (LFC) is measured in pmho/cm. This term refer to the charged/ionized species that can be developed under low electric field where most of them are in the ink liquid phase. Low field conductivity was measured by applying a constant amplitude AC voltage to two parallel electrodes and monitoring the current via the fluid—in this instance, the electric field amplitude was 10V/mm, frequency was 5 Hz, and the temperature was 23° C.

The difference between HFC and LFC estimates the ink particle conductivity (PC); this can also be expressed by HFC—LFC=PC, which also is measured in pmho/cm units.

Comparative Example 1

The particle charge (PC) of commercially available HP White SCD Electroink™ was plotted against the concentration of Synthetic Charge Director (SCD) (given in mg of charge director per g of solids) and the result is shown in FIG. 1, which shows the problematic consequences of high charging obtained with SCD. While the White Electroink™ reaches an unstable region in its charging profile, the Magenta charging set point reaches a relative 'saturation' area.

Example 2

Phthalic anhydride (shown right), in the form white flakes sourced from Sigma Aldrich, was incorporated into Black 4.0 SCD Electroink™,

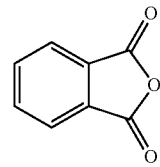 [SMILES: O=C1OC(=O)c2ccccc21]

so that the resulting composition contained varying amounts of phthalic anhydride. The method and instrument are described below.

This electrostatic ink composition was produced using a lab grinding tool called attritor S1, by mixing the formulation as set out below in Table I:

TABLE I

| Black | El 4.0 | % NVS |
|---|---|---|
| Resins - 699:5120 | 65 wt % of solids* | 25% |
| Mon 800 | 20 wt % of solids* | |
| FB 55 | 5 wt % of solids* | |
| VCA | 2 wt % of solids* | |
| HPB | 8 wt % of solids* | |
| Sol-L | | |
| % NVS atr. | 20-30% | |
| Total weight atr. | 2300 | |

*excluding phthalic anhydride.

Figure 2:
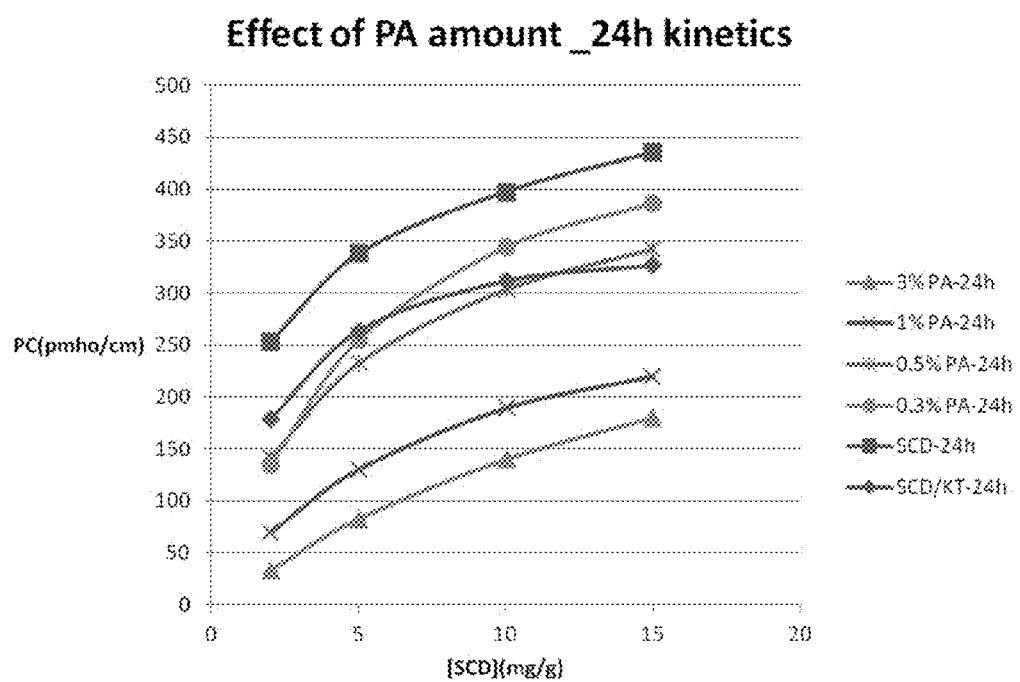
FIG. 2 shows the particle charge (PC) of compositions prepared in Example 2 herein, plotted against the concentration of SCD (synthetic charge director, as described in the Examples below).

Phthalic Anhydride was incorporated into the formulation above, in varying amounts (as indicated in FIG. 2). The phthalic anhydride was added at the start of grinding, together with all components listed above.

Monarch 800 is pigment black 7, a carbon black which is neutral pigment, provided by Cabot company.

FB55 is Pigment Blue 61 m, triphenylmethane sulfonic salt provided by Flint Group company.

The 'Resins' used in the above were Nucrel 699, available from DuPont, and A-C 5120, available from Honeywell.

VCA indicates an aluminum tristearate and palmitate salt, available from Riedel de-Haan.

HPB indicates a homopolymer polyethylene wax, available under the trade name Acumist B6 from Honeywell company.

Sol-L indicates Isopar L, an iso-parfinic oil manufactured by EXXON.

The HPB was added later to the ink dispersion while mixing.

The grinding was carried out in two steps:
i) Hot stage—50-57° C. for 1.5 hour.
ii) Cold stage—36-45° C. for 10.5 hour.

This produced an ink having about 20% solids content. This ink is then diluted to 2% NVS, using further Isopar L, and then the following additives added, as shown in Table II:

TABLE II

| W-12 | SCD | SVM | SE-15 | Marcol | HPB |
|---|---|---|---|---|---|
| 4.0 1-6% W12/ink solids | Up to 30 mg of SCD per gram of solids (see results for amounts) | 0.001-0.1 mg SVM300/gr Sol-L | 0.001-0.01 mg SE15/gr Sol-L | 2-15 mg M-1/gr Sol-L | 2-8% on solids |

W12 is a Teflon powder.

SVM is high viscous, 300 kcSt, Silicon oil, available under the trade name SIG5840 from ABCR.

SE-15 is a defoamer silicon additive, available under the trade name KSG-15 from ShinEtsu. Marcol is a high viscous paraffinic oil with a viscosity of 0.83 gr/cc. Amount for El4.0 shown in table; for El 4.5 it was reduced to 0.5 mg/1 gr Isopar.

The particle charge (PC) of the resulting compositions was plotted against the concentration of SCD and the result is shown in FIG. 2. Also shown is the particle charge vs SCD concentration of Black 4.0 SCD Electroink™ not containing phthalic anhydride together with the particle charge vs SCD concentration of Black 4.0 SCD Electroink™ containing ~0.7 wt % solids KT (soy lecithin). The particles charges were measured after 24 hours.

Example 3

The effect on charging stability over time for the electrostatic ink compositions was investigated. In this test, the particle conductivity was measured at various time points from adding the charge director to the ink. Particle conductivity was measured as described above, based on low field conductivity and high field conductivity measurements. The set point of charging and effect of lower charge director concentrations was also investigated as an indicator of charging stability.

Figure 3:
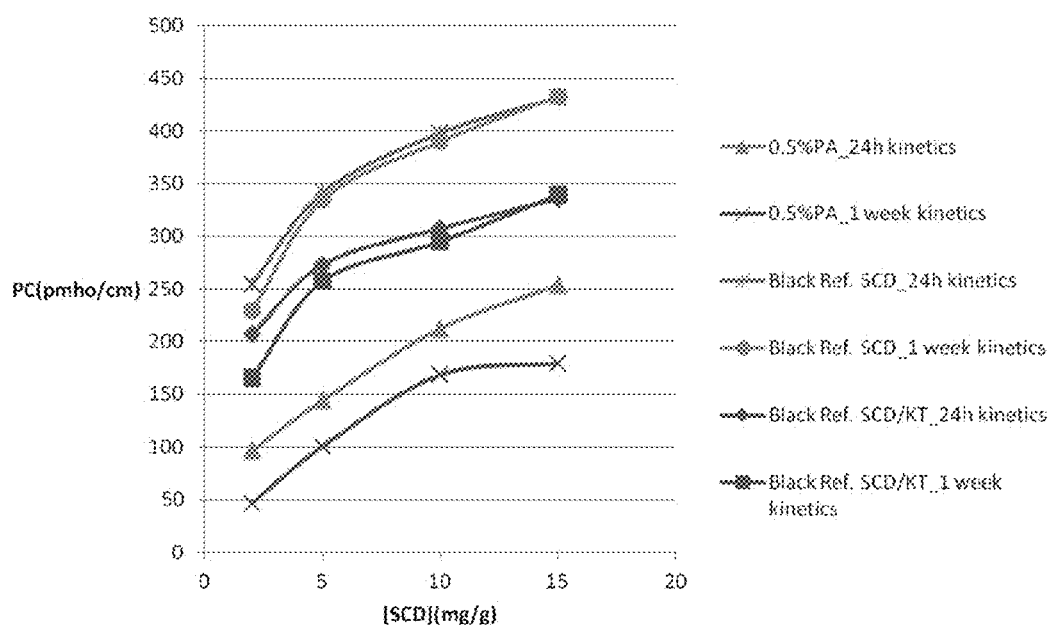
FIG. 3 shows the charging stability of example electrostatic ink compositions (charged with SCD) after 24 hours and after one week, compared to the charging stability of comparable electrostatic ink compositions containing 0.5% phthalic anhydride, as described in Example 3 herein.

FIG. 3 shows the charging stability of Black 4.0 Electroink™ (charged with SCD) after 24 hours and after one week, compared to the charging stability of Black 4.0 Electroink™ in a composition with 0.5% phthalic anhydride after the same periods. After a week the ink containing phthalic anhydride is less stable with a reduction of 20-30% in charging.

This may be undesired where a user returns to use the same ink after a period of time. If ink charging drops, the effect will be seen in a lower optical density and different colors in a printed image.

Example 4

It was investigated whether it was possible to recharge the electrostatic ink composition after the charge had dropped by adding additional charge director. Due to the concern and lab results for the lower charging stability of a black electrostatic ink composition containing the cyclic anhydride, the effect of recharging the ink working dispersion on the press was also investigated. Since a customer may store an ink working dispersion for long period of time, there was a desire to see if correction on press can immediately restore the initial charging level. In this test it was seen that, despite the fact that charging ability was reduced by using the cyclic anhydride, a certain amount of charge director (in this case the SCD) can restore the charging of the electrostatic ink composition.

Figure 4:
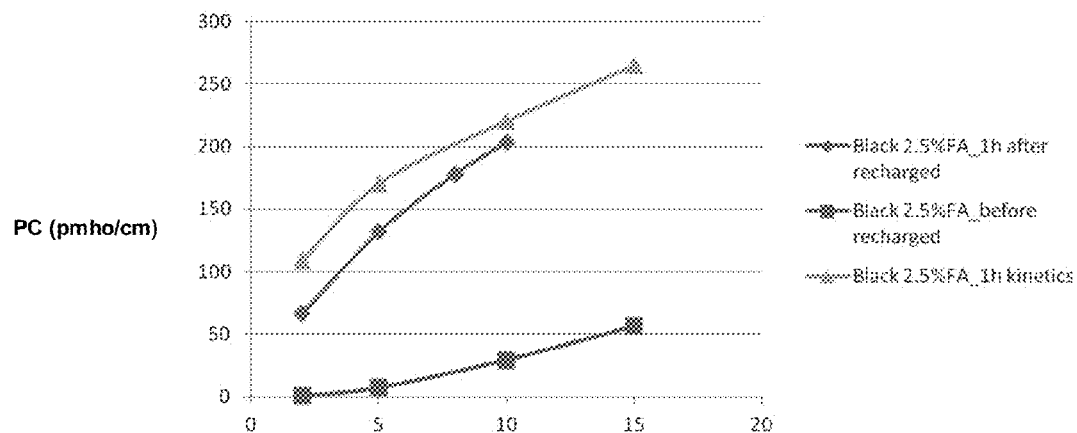
FIG. 4 shows particle charge vs [SCD] [mg/g] for various compositions, as described in Example 4 herein.

FIG. 4 shows that, even though the charge drops over time, the ink can be recharged. After a dramatic decline in charging over more than 2 weeks, the charging was ramped up again by an additional amount of charge director.

Example 5

Figure 5:
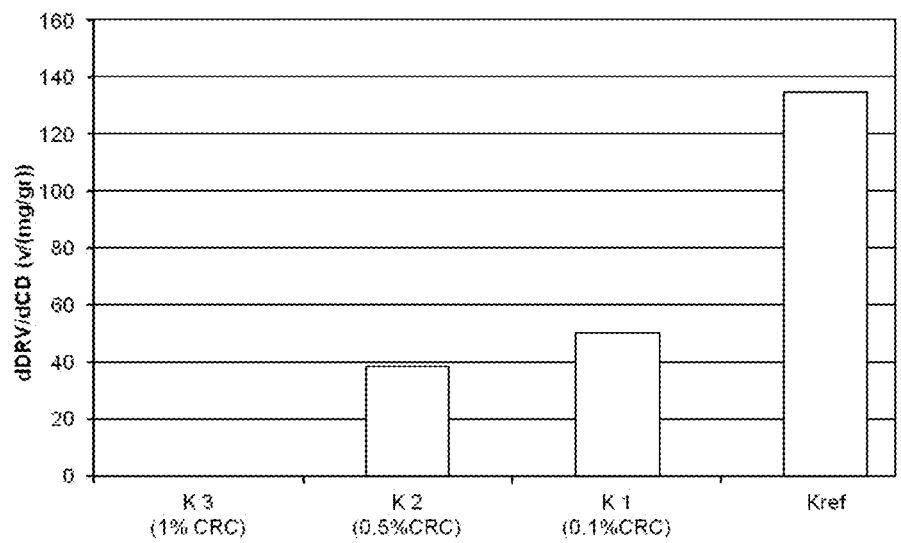
FIG. 5 shows that, in the phthalic anhydride-containing ink, the response to charge director addition declines with increasing amount of phthalic anhydride (termed 'CRC' in this figure, i.e. charge reduction compound).

Apart, of charging correction due to time vector stability in the long term (as investigated in Example 4), there are is also an issue that relates to the short term. While printing with this ink, the response of the charging level and also press developing voltages to charge director addition was investigated. In this test, the ink starts at a low charging level of ink working dispersion mounted in ink tank on the press, and the test progresses by adding a small amount of charge director, SCD, and the resulting response in charging or in developing voltages of BID unit on press was recorded, as seen in FIG. 5. In this Example, the response of the cyclic anhydride-containing electrostatic ink composition vs that of a reference (Kref) electrostatic ink composition of the same kind was investigated.

FIG. 5 shows that, in the phthalic anhydride-containing ink, the response to charge director addition declines with increasing amount of phthalic anhydride. So, as part of reducing the charging level, the response is also affected, which enables this lower charging to be maintained while printing.

Example 6

Phthalic anhydride (PA, shown below), in the form white flakes sourced from Sigma Aldrich, was incorporated into Black 4.0 SCD Electroink™, so that the resulting composition contained 3 wt % by solids of phthalic anhydride. The ink preparation was prepared as described above in Example 2. To summarise: at the first stage a paste of molten resins in Isopar-L is prepared in mixing device called "Mayers", in which the resins and the Isopar are mixed at a temperature of ~140-150° C. The wt/wt ratio between the resins and Isopar is 10-40% resins and 60-90% Isopar. The resins contain the mixture of polymers described above. The molten and swollen resins paste is inserted into a miling machine called attritor S1 with, for example, a possible formulation of Black electrostatic ink composition described above. The grinding formulation contain a hot stage and cold stage where in lab Attritor takes usually around 12 hours in total, similar to the example described above.

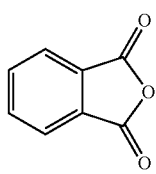

Example 7

An example ink was prepared using the same method as in Example 6, except that benzophenone tetracarboxylic dianhanydride (BTCD) was used instead of phthalic anhydride.

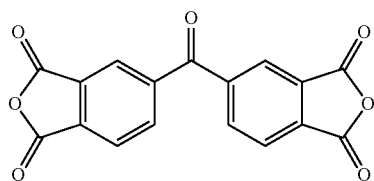 [SMILES: O=C(c1ccc2c(c1)C(=O)OC2=O)c1ccc2c(c1)C(=O)OC2=O]

Example 8

An example ink was prepared using the same method as in Example 6, except that 3,3-dimethylglutaric anhydride (DMGA) was used instead of phthalic anhydride.

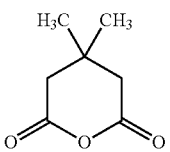

Example 9

An example ink was prepared using the same method as for Example 6, except that diglycolic anhydride (DGA) was used instead of phthalic anhydride.

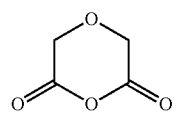

Example 10

An example ink was prepared using the same method as in Example 6, except that bromomaleic anhydride (BMA) was used instead of phthalic anhydride.

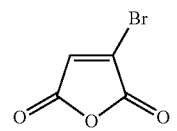

Example 11

An example ink was prepared using the same method as for Example 6, except that 1,4,5,8-naphthalenetetracarboxylic dianhydride (N818) was used instead of phthalic anhydride.

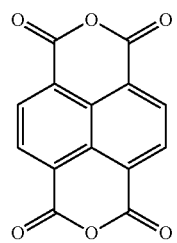

Example 12

An example ink was prepared using the same method as for Example 6, except that 1,8-naphthalic anhydride (N160) was used instead of phthalic anhydride.

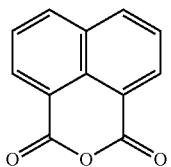

Figure 6:
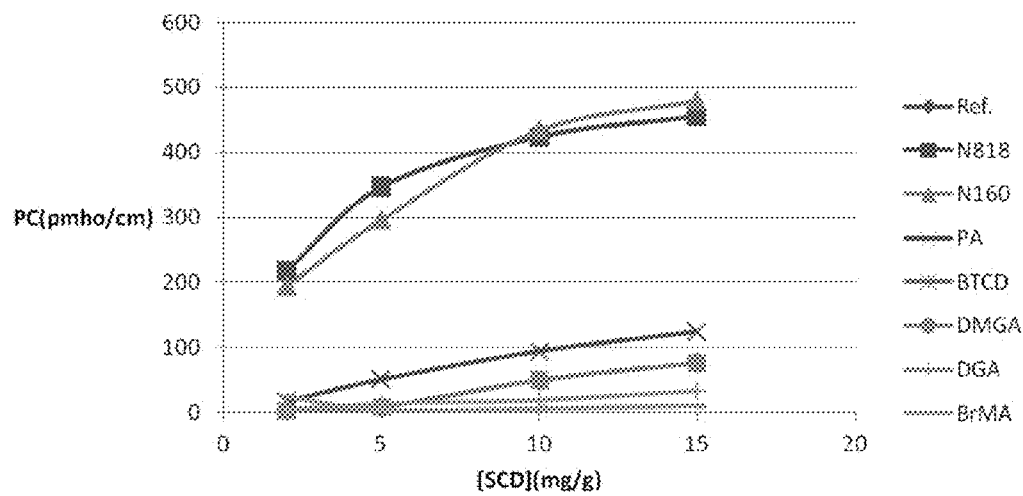
FIG. 6 shows the particle charge (PC) of the compositions of each of Examples 6-12, plotted against the concentration of SCD.

The particle charge (PC) of the compositions of each of Examples 6-12 was plotted against the concentration of SCD and the result is shown in FIG. 6. Also shown is the particle charge vs SCD concentration of the Black 4.0 SCD Electroink™ not containing phthalic anhydride (labelled "Ref").

FIG. 6 shows that the use of all of the cyclic anhydrides has affected the charging of the electrostatic ink composition dramatically and lowered it substantially. N160 reduced charging for longer kinetic times and this might be due to the stabilization made by the bis aromatic ring group.

Example 13

Figure 7:
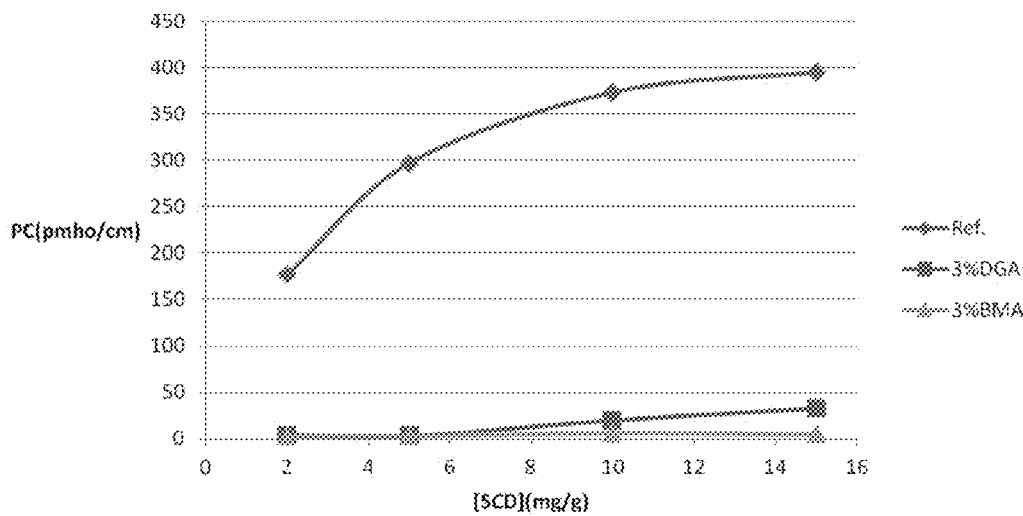
FIG. 7 shows the particle charge (PC) of the compositions of Examples 9 and 10 (but containing no charge adjuvant), plotted against the concentration of SCD.

It was also investigated whether or not the cyclic anhydrides are effective in inks without a charge adjuvant (e.g. VCA, Aluminum stearate/palmitate). The particle charge (PC) of the compositions of Examples 9 and 10 (but containing no charge adjuvant) was plotted against the concentration of SCD and the result is shown in FIG. 7. Also shown is the particle charge vs SCD concentration of the Black 4.0 SCD Electroink™ not containing cyclic anhydrides or charge adjuvant (labelled "Ref").

Example 14

The effect of the amount of these cyclic anhydrides on charging reduction was also tested. Therefore compositions according to Example 13, but having BMA in an amount of 1% and 0.3% of ink total solids were prepared.

Figure 8:
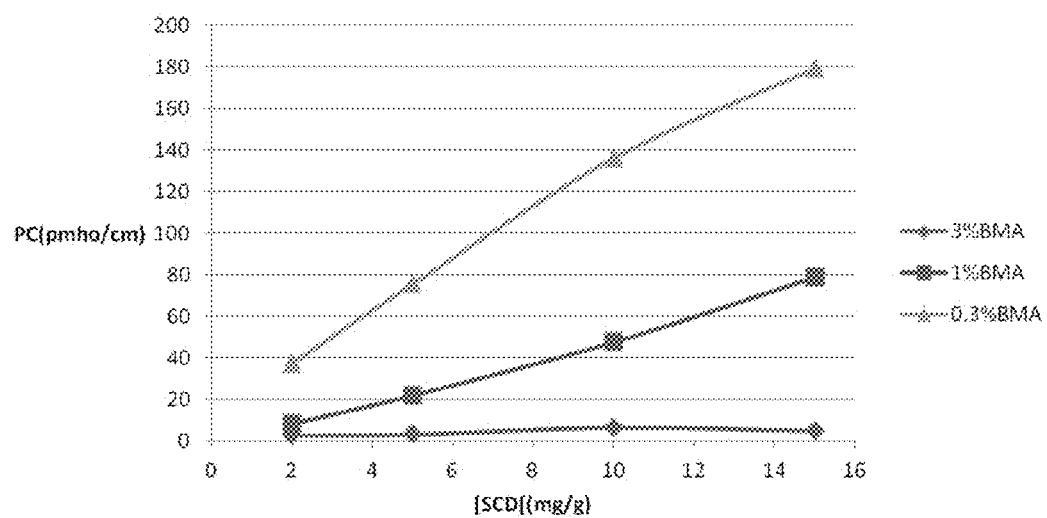
FIG. 8 shows the particle charge (PC) of the compositions described in Example 14, plotted against the concentration of SCD.

FIG. 8 shows that, as the amount of BMA is reduced, then the charging goes up. It is therefore possible to adjust the amount of charging reducing agent to the level required. It is also interesting to note that the charging curve is not saturated but reasonably linear with regard to the concentration of SCD added.

While the electrostatic ink composition and related aspects have been described with reference to certain examples, those skilled in the art will appreciate that various modifications, changes, omissions, and substitutions can be made without departing from the spirit of the disclosure. It is intended, therefore, that the compositions and related aspects be limited by the scope of the following claims. The features of any dependent claim can be combined with the features of any of the other dependent claims, and any independent claim.

The invention claimed is:

1. An electrostatic ink composition, wherein the composition is formable by combining:
 chargeable particles comprising a resin comprising a polymer having acidic side groups which are free of ester groups, and further comprising a polymer having ester side groups,
 a cyclic anhydride, wherein the cyclic anhydride is selected from benzophenone tetracarboxylic dianhydride, 3,3-dimethylglutaric anhydride, diglycolic anhydride, or bromomaleic anhydride, and
 a carrier liquid, wherein the chargeable particles are dispersed in the carrier liquid.

2. The electrostatic ink composition according to claim 1, wherein the cyclic anhydride constitutes from 0.1 wt % to 10 wt % of the solids of the electrostatic ink composition.

3. The electrostatic ink composition according to claim 1, wherein the cyclic anhydride constitutes from 0.5 wt % to 3 wt % of the solids of the electrostatic ink composition.

4. The electrostatic ink composition according to claim 1, wherein the electrostatic ink composition further comprises a charge director.

5. The electrostatic ink composition according to claim 4, wherein the charge director comprises a sulfosuccinate moiety of the general formula $[R_{1'}-O-C(O)CH_2CH(SO_3^-)C(O)-O-R_{2'}]$, where each of $R_{1'}$ and $R_{2'}$ is an alkyl group.

6. The electrostatic ink composition according to claim 5, wherein each of $R_{1'}$ and $R_{2'}$ independently is a $C_{6-25}$ alkyl.

7. The electrostatic ink composition according to claim 1, wherein the polymer having acidic side groups is a co-polymer of (ii) a first monomer having acidic side groups selected from acrylic or methacrylic acid and (iii) a second monomer which is an alkylene monomer selected from ethylene and propylene.

8. The electrostatic ink composition according to claim 1, wherein the polymer having ester side groups is a co-polymer of a first monomer having ester side groups, a second monomer having acidic side groups, and a third monomer which is an alkylene monomer.

9. The electrostatic ink composition according to claim 8, wherein the first monomer constitutes 8% to 12% by weight of the co-polymer, the second monomer constitutes 8% to 12% by weight of the co-polymer, and the third monomer constitutes the remaining weight of the co-polymer.

10. A method of forming the electrostatic ink composition of claim 1, the method comprising combining the chargeable particles and the cyclic anhydride.

11. The electrostatic ink composition according to claim 1, wherein the cyclic anhydride is bromomaleic anhydride.

12. A method of electrostatic printing, the method comprising:
 providing the electrostatic ink composition according to claim 1,
 contacting the electrostatic ink composition with a latent electrostatic image on a surface to create a developed image; and
 transferring the developed image to a print substrate.

13. An electrostatic ink composition, wherein the composition is formable by combining:
 chargeable particles comprising a resin comprising a polymer having acidic side groups which are free of ester groups, and further comprising a polymer having ester side groups, and
 bromomaleic anhydride.

14. The electrostatic ink composition according to claim 13, wherein the cyclic anhydride constitutes from 0.1 wt % to 10 wt % of the solids of the electrostatic ink composition.

15. The electrostatic ink composition according to claim 13, wherein the cyclic anhydride constitutes from 0.5 wt % to 3 wt % of the solids of the electrostatic ink composition.

16. The electrostatic ink composition according to claim 13, wherein the electrostatic ink composition further comprises a charge director.

17. The electrostatic ink composition according to claim 16, wherein the charge director comprises a sulfosuccinate moiety of the general formula $[R_{1'}-O-C(O)CH_2CH(SO_3^-)C(O)-O-R_{2'}]$, where each of $R_{1'}$ and $R_{2'}$ is an alkyl group.

18. The electrostatic ink composition according to claim 17, wherein each of $R_{1'}$ and $R_{2'}$ independently is a $C_{6-25}$ alkyl.

19. The electrostatic ink composition according to claim 13, wherein the polymer having acidic side groups is a co-polymer of (ii) a first monomer having acidic side groups selected from acrylic or methacrylic acid and (iii) a second monomer which is an alkylene monomer selected from ethylene and propylene.

20. The electrostatic ink composition according to claim 13, wherein the composition further comprises a carrier liquid and the chargeable particles comprising the resin comprising the polymer having acidic side groups are dispersed in the liquid carrier.

21. The electrostatic ink composition according to claim 13, wherein the polymer having ester side groups is a co-polymer of a first monomer having ester side groups, a second monomer having acidic side groups, and a third monomer which is an alkylene monomer.

22. The electrostatic ink composition according to claim 21, wherein the first monomer constitutes 8% to 12% by weight of the co-polymer, the second monomer constitutes 8% to 12% by weight of the co-polymer, and the third monomer constitutes the remaining weight of the co-polymer.

* * * * *